United States Patent [19]

Hunter et al.

[11] 4,190,453

[45] Feb. 26, 1980

[54] CASTING AND MOULDING COMPOSITIONS

[75] Inventors: Donald N. Hunter; Lesley J. Wyatt, both of Bognor Regis, England

[73] Assignee: Rosemount Engineering Company Limited, England

[21] Appl. No.: 895,911

[22] Filed: Apr. 13, 1978

[30] Foreign Application Priority Data

Apr. 18, 1977 [GB] United Kingdom ............... 16035/77

[51] Int. Cl.$^2$ ............................................. C04B 19/00
[52] U.S. Cl. ................................................... 106/85
[58] Field of Search .................................... 106/65, 85

[56] References Cited

U.S. PATENT DOCUMENTS

| | | | |
|---|---|---|---|
| 3,179,524 | 4/1965 | Hunter | 106/65 |
| 3,329,516 | 7/1967 | Chvatal | 106/65 |
| 3,547,670 | 12/1970 | Fuchs et al. | 106/65 |
| 3,885,978 | 5/1975 | Doi et al. | 106/85 |

*Primary Examiner*—James Poer
*Attorney, Agent, or Firm*—Kinney, Lange, Westman and Fairbairn

[57] ABSTRACT

A process for preparing a heat-settable casting or moulding composition comprises forming a mixture of a refractory oxide, preferably alumina, and a polyvalent metal polyphosphate, the polyvalent metal being preferably magnesium, aluminium, cobalt or zinc. The mixture is preferably formed by precipitating the polyvalent metal polyphosphate from an aqueous solution of an alkali metal polyphosphate in the presence of the refractory oxide by the addition of a water soluble polyvalent metal salt to the solution.

The compositions are useful in making encapsulated or "potted" components such as resistance thermometers and thermocouples.

2 Claims, No Drawings

CASTING AND MOULDING COMPOSITIONS

BACKGROUND OF THE INVENTION

1. FIELD OF THE INVENTION

This invention relates to heat-settable casting and moulding compositions and to processes for their production.

2. DESCRIPTION OF THE PRIOR ART

In U.K. Patent Specification No. 922,384 there is described a process for producing inorganic polymeric compositions, for example in the form of mouldings, comprising heating together alkali metal polymetaphosphates, preferably containing lithium ions, with certain metal oxides.

SUMMARY OF THE INVENTION

It has now been discovered that casting or moulding compositions which are particularly suitable for use in producing castings or mouldings having relatively high thermal stability and electrical resistance such as is required for example in the encapsulation or so-called "potting" of temperature measuring instruments such as resistance thermometers and thermocouples, but which on the other hand may be cast or moulded at relatively low temperatures, can be prepared by mixing together a polyvalent metal polyphosphate and a refractory oxide.

Thus, according to the present invention there is provided a casting or moulding composition comprising a mixture of a refractory oxide and a polyvalent metal polyphosphate.

The present invention also provides a process for the production of such a casting or moulding composition which method comprises precipitating a polyvalent metal polyphosphate from an aqueous solution of an alkali metal polyphosphate in the presence of a refractory oxide by the addition of a water-soluble polyvalent metal salt to the solution, and thereafter separating the mixture of refractory oxide and polyvalent metal polyphosphate from the solution.

The invention also extends to a method of casting or moulding which method comprises charging a composition as described above into a mould, heating the composition, optionally under pressure, at a temperature sufficient to cause sintering, so as to form an integral mass and thereafter causing or allowing the composition to cool.

Additionally included within the scope of the invention are cast or moulded articles when made from the afore-described composition, and in particular encapsulated or "potted" components such as resistance thermometers and thermocouples.

The refractory oxide which is used in the present invention is preferably alumina, but other oxides can be used, such as silica or aluminium silicate.

The aqueous solution of alkali metal polyphosphate is conveniently prepared from potassium metaphosphate, Kurrol's salt, as is described hereafter.

DESCRIPTION OF THE PREFERRED EMBODIMENTS

Following is a description by way of example of a series of experiments which were performed in which a number of different polyvalent metal polyphosphates were precipitated on to alumina and the resulting compositions were tested as casting compositions.

The polyphosphates were prepared as follows:

10 grams of sodium chloride were dissolved in one liter of deionized water, the solution stirred and 19.5 grams (1/6 mol) of potassium metaphosphate (Kurrol's salt) added and stirred for 30 minutes until in solution. 20 grams of 400 mesh α alumina was then added to the stirred solution, followed by 1/6 mol equivalent of metal salt. The quantities of metal salts used were as follows:

| Element | Salt | Quantity Used |
| --- | --- | --- |
| Mg | $MgCl_2 \cdot 6H_2O$ | 17 grams in 20 ml $H_2O$ |
| Al | $AlCl_3$ | 7.4 grams in 50 ml $H_2O$ |
| Ca | $CaCl_2 \cdot 2H_2O$ | 12.25 grams in 50 ml $H_2O$ |
| Fe | $Fe(NO_3)_3 \cdot 9H_2O$ | 22.5 grams in 100 ml $H_2O$ |
| Ni | $NiCl_2 \cdot 6H_2O$ | 20.0 grams in 30 ml $H_2O$ |
| Co | $CoCl_2 \cdot 6H_2O$ | 20.0 grams in 100 ml $H_2O$ |
| Cu | $CuSO_4 \cdot 5H_2O$ | 21.0 grams in 100 ml $H_2O$ |
| Zn | $ZnCl_2$ | 11.3 grams in 20 ml $H_2O$ |
| Sn | $SnCl_2 \cdot 2H_2O$ | 19.0 grams in 100 ml $H_2O$ |
| Pb | $Pb(NO_3)_2$ | 27.6 grams in 100 ml $H_2O$ |

The polyphosphate precipitated on to the alumina was separated from the mother liquor and dried for 24 hours at 40° C. and then for 2½ hours at 160° C. The products were ground to a poweder using a mechanical mortar and pestle.

To make the castings the polyphosphate/alumina powders were charged into glass test tubes, tapping the tubes to consolidate the powders. The filled tubes were then placed vertically in an oven and heated to 380° C. from room temperature over one hour, then held at 380° C. for one hour.

The following polyphosphate/alumina mixtures sintered to form solid castings:

| Element | Atomic Weight | Sinters at 380° C. |
| --- | --- | --- |
| Mg | 24.3 | Yes |
| Al | 27 | Yes |
| Ca | 40 | No |
| Fe | 55.8 | No |
| Ni | 58.7 | No |
| Co | 59.0 | Yes |
| Cu | 63.5 | No |
| Zn | 65.4 | Yes |
| Sn | 118.7 | No |
| Pb | 207 | No |

Thus, the Mg, Al, Co and Zn polyphosphate/alumina mixtures sinter to form solid castings. It was subsequently found that sintering took place at temperatures as low as 280° C. The resultant castings were stable to at least 1,000° C. and had the following insulation resistance at 500° C. (Measured between potted nickel wires 1 mm apart using a Megger).

Mg: 6.0 MΩ at 250 volts or 0.08 MΩm
Al: 10.0 MΩ at 250 volts or 0.13 MΩm
Co: 15.0 MΩ at 250 volts or 0.2 MΩm
Zn: 270,000 Ω at 250 volts or 0.004 MΩm The specific materials described above have been found to be useful as potting cements and, unlike commercial refractory cements, have no solvent or water to remove during the setting process. They can also be moulded into dense bodies by pressing in steel moulds at about 300° C.

We claim:

1. A process for preparing a water free heatsettable casting or moulding composition which process comprises forming a mixture of alumina and a polyvalent metal polyphosphate by precipitating said polyvalent metal polyphosphate from an aqueous solution of an alkali metal polyphosphate in the presence of said alumina by the addition of a water-soluble polyvalent metal salt to said solution, thereafter separating said alumina and said polyvalent metal polyphosphate together from said solution, and drying the mixture of polyvalent metal polyphosphate and alumina.

2. A process as claimed in claim 1 wherein said polyvalent metal is selected from the group consisting of magnesium, aluminium, cobalt and zinc.

* * * * *